Figure 3:
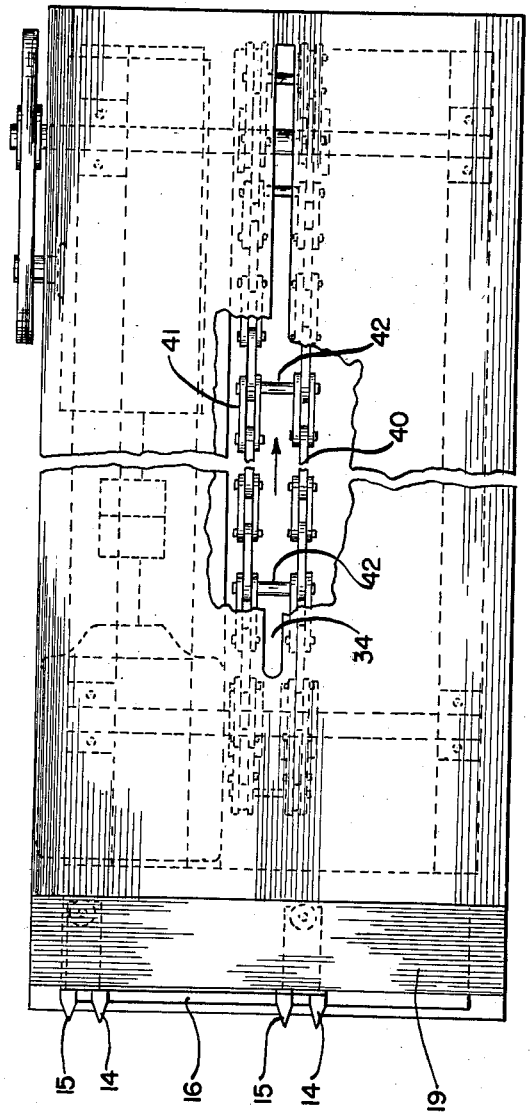

June 23, 1953  F. J. COAD  2,642,619
SKINNING MACHINE
Original Filed July 18, 1944  4 Sheets-Sheet 1
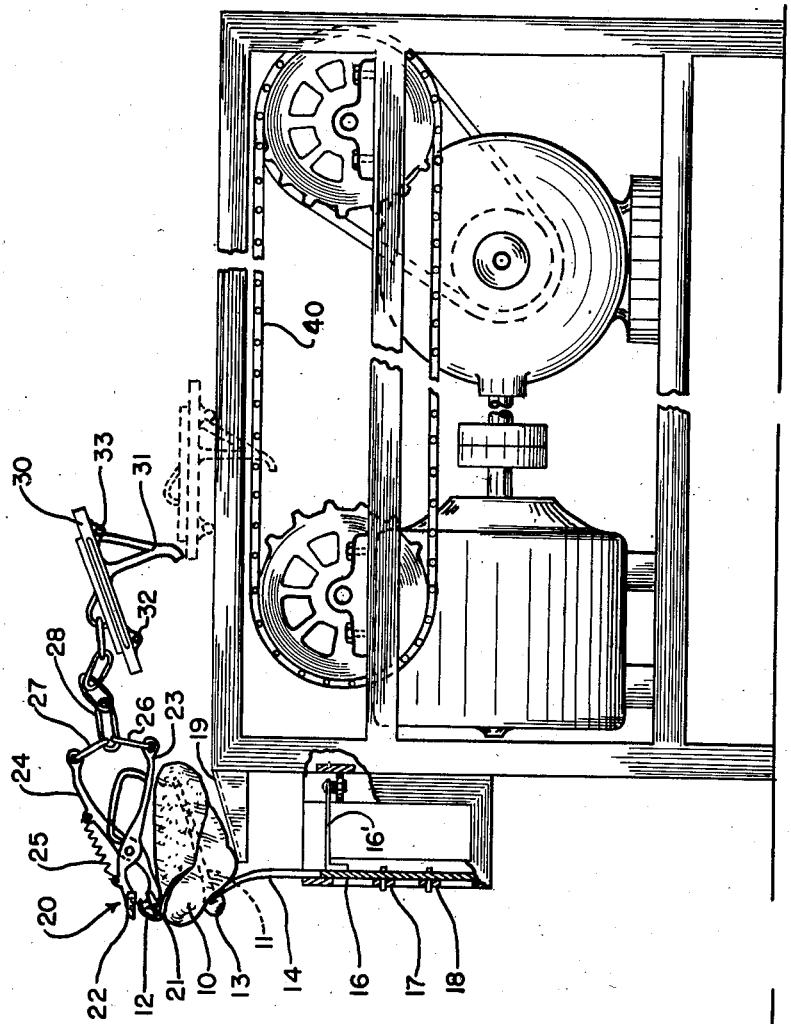
FIG. 1
FIG. 2
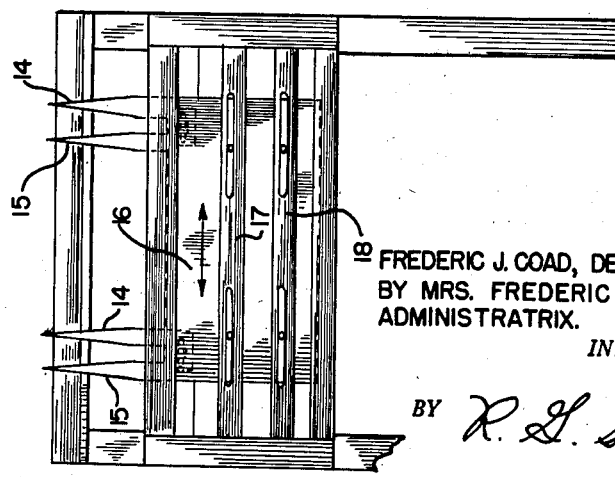
FREDERIC J. COAD, DECEASED,
BY MRS. FREDERIC J. COAD,
ADMINISTRATRIX.
INVENTOR.
BY R. L. Story
ATTORNEY June 23, 1953  F. J. COAD  2,642,619
SKINNING MACHINE
Original Filed July 18, 1944  4 Sheets-Sheet 2

FREDERIC J. COAD, DECEASED,
BY MRS. FREDERIC J. COAD,
ADMINISTRATRIX.
INVENTOR.

BY R. L. Story

ATTORNEY

June 23, 1953     F. J. COAD     2,642,619
SKINNING MACHINE
Original Filed July 18, 1944     4 Sheets-Sheet 3
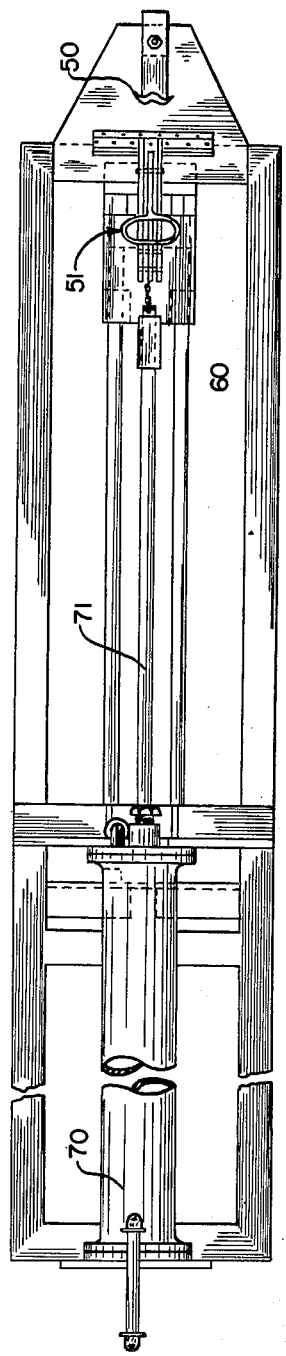
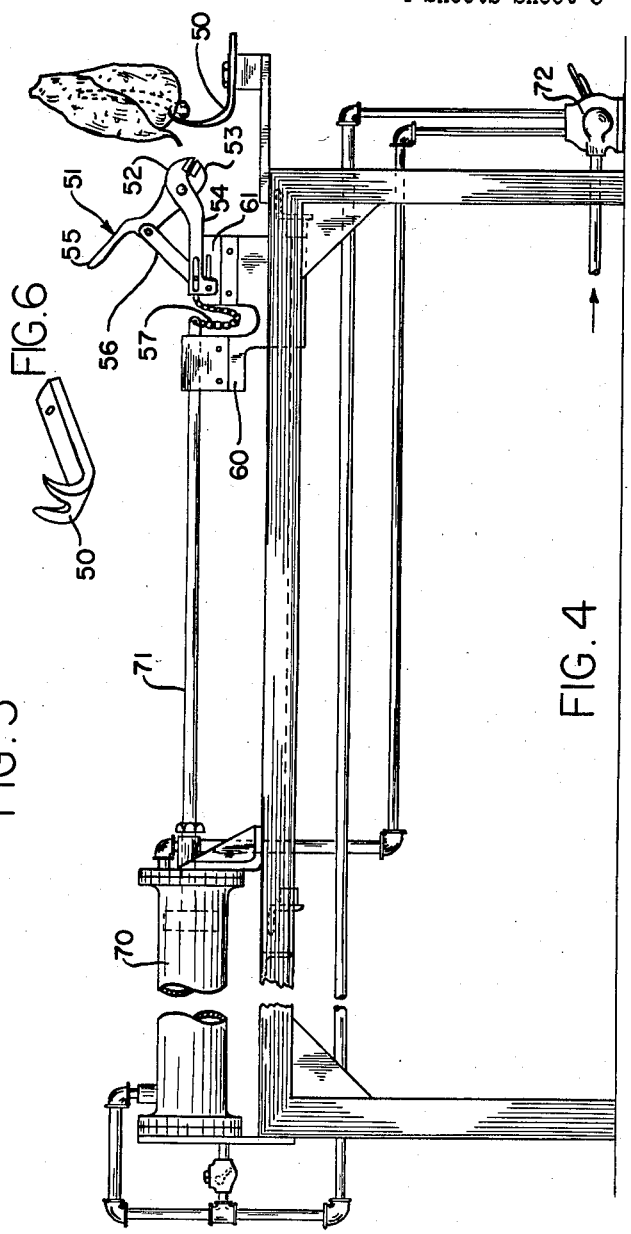
FREDERIC J. COAD, DECEASED,
BY MRS. FREDERIC J. COAD,
ADMINISTRATRIX.
*INVENTOR.*
BY R. L. Story
ATTORNEY June 23, 1953     F. J. COAD     2,642,619
SKINNING MACHINE Original Filed July 18, 1944     4 Sheets-Sheet 4

FREDERIC J. COAD, DECEASED,
BY MRS. FREDERIC J. COAD,
ADMINISTRATRIX.
*INVENTOR.*

BY R. L. Story

ATTORNEY

Patented June 23, 1953

2,642,619

UNITED STATES PATENT OFFICE 2,642,619

SKINNING MACHINE

Frederic J. Coad, deceased, late of Des Moines, Iowa, by Mrs. Frederic J. Coad, administratrix, Des Moines, Iowa, assignor, by mesne assignments, to Swift & Company, Chicago, Ill., a corporation of Illinois Original applications July 18, 1944, Serial No. 545,474, and August 9, 1948, Serial No. 43,286. Divided and this application September 28, 1951, Serial No. 249,371

6 Claims. (Cl. 17—21)

This application is a division of application Serial No. 545,474 filed July 18, 1944, which application issued as Patent No. 2,461,466, and application Serial No. 43,286 filed August 9, 1948, which application issued as Patent No. 2,587,967.

This invention relates to a machine for removing skin from meat cuts and more particularly to a device for forcibly pulling skin from a meat shoulder or ham cut.

It is an object of this invention to provide a machine for pulling skin from a meat cut.

It is another object of this invention to provide an improved means for removing skin from a plurality of shoulder cuts or ham cuts.

Other objects will appear below.

In preparing certain meat items for the consumer trade it is necessary that the skin be removed from the cut and particularly is this true when ham and shoulder cuts are prepared for the retail trade with the bone removed. Furthermore skin is a valuable by-product yielding either a high grade gelatin or leather, and, therefore, when supplying large volumes of certain cuts to the hotel and restaurant trade where the skin cannot be utilized it is removed from these cuts for its value as a by-product.

It has been the practice in the past to remove the skins by a cutting operation and mechanical cutting means are available to remove the skin from a flat slab of meat. When, however, an irregularly shaped cut such as a shoulder or ham cut is to be skinned, it is necessary that hand cutting operation be performed to effect a separation of the skin.

In removing the skin from an irregularly shaped cut by hand, not only is considerable labor involved but also the labor must be quite skilled. If the skin is to be used in the preparation of leather, it must be removed in an undamaged condition and yet it is desirable to separate the skin from the cut without leaving any meat or fat clinging to the flesh side of the skin. It is seen therefore that the most efficient removal of the skin requires the operator to rapidly sever the skin from the meat cut by slicing through the layer beneath the skin. It is thus readily apparent that considerable practice is required before an operator can perform this relatively delicate operation in a rapid manner.

The present invention has been provided to make available a skinning machine adapted to the removal of skin from an irregularly shaped cut of meat without necessitating a cutting operation such as might injure the skin. It provides a means for relatively fixing the meat cut while a pulling force is exerted against the skin and, when the pulling force is applied in the right direction, the skin may be peeled off quite effectively without tearing or otherwise damaging the skin.

Figure 7:
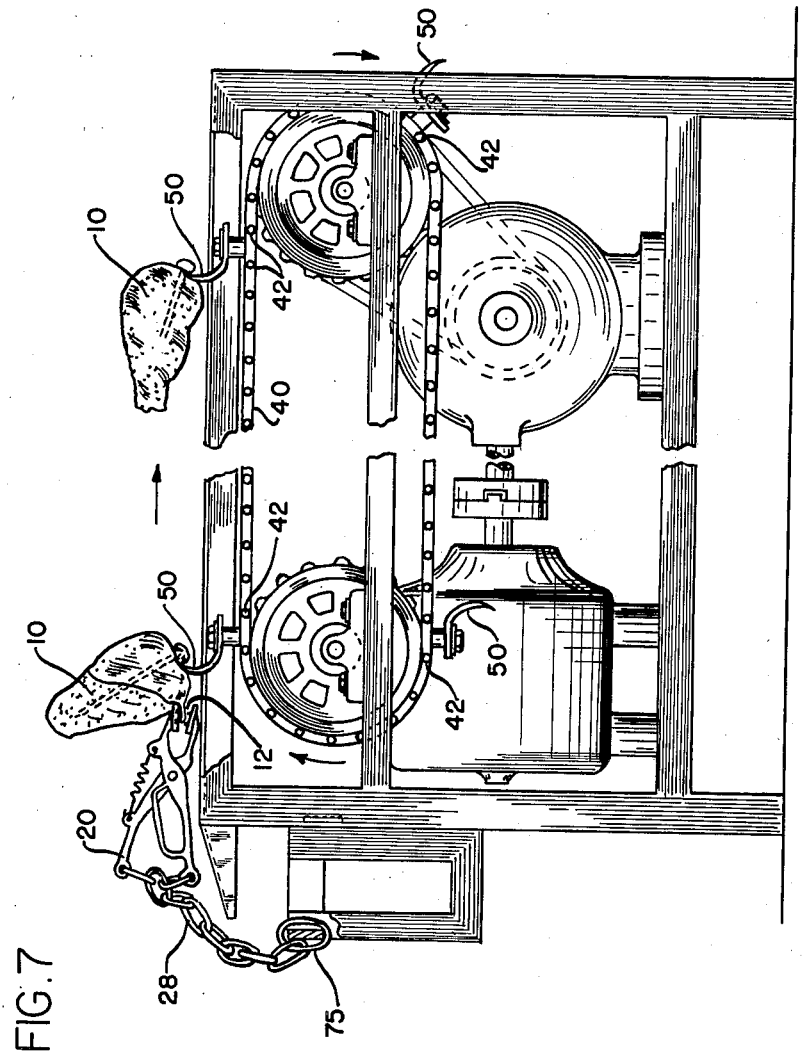

The machine forming an embodiment of the subject of this invention is shown in the drawings wherein:

Figure 1 represents a side elevation partly broken away of the preferred form of the machine for simultaneously handling a plurality of irregularly shaped cuts during the skinning operation, Figure 2 represents an end elevation partly broken away of the preferred form of the machine shown in Figure 1, Figure 3 represents a plan view partly broken away of the preferred form of the machine shown in Figure 1, Figure 4 represents a side elevation of a second form of the machine, Figure 5 is a plan view of the machine shown in Figure 4, Figure 6 is a perspective view of a bifurcated hook element shown in Figs. 4 and 5 for engaging the meat cut, and Figure 7 is a side elevation of a form of the machine illustrated in Figure 1 in which the ham cut is moved while holding the skin relatively stationary.

In general, the preparation of boned shoulder and ham cuts includes a skinning operation. While the present invention finds particular application to the skinning of such portions of a carcass, it will be apparent as the description proceeds that the invention may find use in the skinning of larger cuts and up to one-half and whole carcasses. These ham and shoulder cuts, however, have a generally irregular shape and thus cannot readily be adapted to a machine cutting operation for removal of the skin from around the entire periphery of the cut. The herein disclosed invention is, therefore, particularly adapted to the skinning of cuts of this type by a skin pulling method. When the shoulder and ham cuts are removed from the carcass the shoulder cut, for example, is severed so that the humerus bone extends longitudinally through the cut. The ham is removed in such a manner that the femur bone extends through the cut. Each of the humerus and femur bones of course is formed with an enlarged end where the bones engage the shoulder and elbow joints, or hip and knee joints respectively.

It has been found that the skin may be rapidly removed from such an irregularly shaped cut by a pulling action. When the skin is properly prepared and is forcibly drawn from the cut, the fell layer separates and the skin is stripped off without damage to the meat or itself and it is generally free of all clinging meat and fat particles. This is true with respect to beef and lamb cuts. With pork, however, which has no layer of fell between the skin and the flesh, the skin is similarly peeled off when pulled in this manner.

To remove skins by pulling, in accordance with this teaching, the cut is fixed in a machine designed for a power pulling action whereupon the skin is pulled back upon itself so that it is peeled from the meat. The shoulder or ham cut is prepared for skinning by having a tab of skin lifted up on the outside of the leg cut so that it may be engaged by suitable clamping means and, in addition, the skin is just cut through along a line generally parallel with the longitudinally extending bone of the cut on the inside portion of the leg of the animal. The inside cut is carefully made so that only the skin is cut. The incision need be no deeper.

When pulling the skin from the cut it has been found that the most satisfactory skin removal results from engaging the skin in a manner such that it is ripped from the cut by reversing the skin upon itself. The fell layer of beef or lamb, for example, is more quickly broken by this procedure because the pulling force is always directly applied to the fell at the fold as the skin folds over upon itself. The fell is comprised of many small fibers interlaced and bonded to the skin and flesh. This manner of pulling exerts a maximum pull against a fewer number of fell fibers than any other method so that the fibers are tensioned and broken before the pulling force can be substantially transmitted and distributed through the flesh or other more remote fell fibers. A similar advantage in directing the application of the pulling force substantially to the line of separation at the fold of the skin is also realized in skinning pork, and the pork skin is easily rolled back upon itself in a manner to be quickly and easily separated from the flesh and fat.

A machine adapted to perform this operation is shown in the drawings and referring to Figure 1, ham cut 10 is shown in position to be engaged by a clamping means to effect a removal of the skin from the cut. The ham has femur bone 11 extending therethrough and a skin tab denoted 12. The femur bone 11 has an enlarged hip joint end 13 at the butt end of the cut, which may be engaged between one of the pairs of the prongs 14 and 15 forming a holding means for a cut on the skinning machine.

The two pairs of prongs 14 and 15 are fixedly mounted on a suitable movable supporting head 16 slidable in the direction of the arrows shown in Figure 2. The head 16 may be mounted upon guide tracks 17 and 18 for this lateral movement across the machine for a purpose that will appear more fully below, and the two pairs of prongs are supported on the head to hold the meat cut engaged thereby on table 19. Suitable stiffening arms 16' may be fixedly mounted on the side of supporting head 16 which faces the frame of the machine, the arms carrying rollers at their free ends to bear against the frame of the machine in order to brace the hooks against the frame of the machine when the skin peeling force is applied. It is to be understood of course that the skin may be slit on the inside of the leg when the tab is loosened on the outside before the cut is placed on the table and between the prongs.

When the ham is so positioned on the table 19 and the end 13 of the bone is firmly engaged between the one pair of prongs 14 and 15, a clamp 20 is fixed to the tab 12 by engagement of jaws 21 and 22 whereupon the clamp 20 may then be connected to a driven pulling mechanism.

Clamp 20 may take the form of a pincher like device wherein the jaws 21 and 22 are driven together upon closing of arms 23 and 24. Arms 23 and 24 are normally urged apart by spring 25 and are closed together when links 26 and 27 are pulled outwardly as when chain 28 is connected to the pulling means. This construction provides a clamping device which is normally urged to position for releasing anything engaged between the jaws 21 and 22 yet when once engaged, and as long as pulling action is exerted, the jaws tend to engage the skin more tightly as the pulling effort increases. As long as the closing tendency caused by the pulling action is greater than the contracting force of spring 25, the skin will remain firmly engaged between jaws 21 and 22, and the spring tension is selected to be such that the jaws remain closed until the skin pulling operation is complete.

The flexible link or chain 28 for transmitting the pulling force to the clamp 20 is fixed at one end to a carriage 30. Carriage 30 is provided with a downwardly extending hook arm 31 adapted for engagement with the driven pulling means. Carriage 30 is designed to slide or ride across the top surface of the pulling machine and has suitable bearing members 32 and 33 for supporting the carriage on this surface or slideway. A slot 34, Figure 3, in the surface permits the hook arm 31 to extend downwardly therefrom for engagement with the pulling means.

The invention here shown makes use of a pulling means taking the form of a pair of driven chains 40 and 41 carried on suitable sprocket wheels. These two chains are interconnected at spaced points with cross bars 42 and the upper run of the composite chain structure is positioned below slot 34 to cooperate with the hook arm 31 to drive the carriage forwardly in the direction of the arrow as shown in Figures 1 and 3. The chains 40 and 41 may be driven from any suitable power source to effect the desired pulling action.

The above described mechanism is operative to engage the skin of any cut fixedly held with respect to chains 40 and 41 so that the skin may be pulled therefrom. A cut may be laid on the table 19 and engaged in the machine by forcing the bone between one of the pairs of prongs 14 and 15, as shown in Figure 1. The head 16 is then adjusted laterally to place the cut generally in front of the slot 34 whereupon the jaws 21 and 22 may be closed onto the tab 12 and the chain 28 pulled to clamp the jaws. Then the hook arm 31 is dropped down through slot 34 and between chains 40 and 41 for engagement with one of the cross bars 42 of the driven pulling means. When the hook arm is taken up behind one of the cross bars 42, it is carried forwardly and carriage 30 rides forwardly on the slideway on upper surface of the frame of the machine. The forward motion of the carriage 30 through link 28 and clamp 20 pulls the skin off of the cut progressively from one end to the other by reversing the skin upon itself. The jaws 21 and 22 are, by this action, driven together so that the skin is firmly engaged during the entire pulling operation.

It has been found that when the skin is pulled from a meat cut in this manner the skin is removed quite satisfactorily without damage to the meat structure itself or to the skin. As soon as the skin is completely removed from the cut, the pulling force against chain 28 is released and the clamp 20 is opened by spring 25 so that the skin may be released. As soon as the skin has been pulled from the cut, the carriage 30 reaches approximately the end of the track and the clamp and carriage may be lifted from the machine and returned to the starting point for attachment to a subsequent cut for skinning.

While one cut is in position and during the skin pulling operation being performed thereon in the machine shown in Figure 1, a second cut may be engaged on the other pair of prongs 14 and 15. The tab 12 of this second cut may then be raised and engaged onto a clamp 20 so that as soon as the skin pulling process being performed, is completed, the head 16 may be shifted to move the skinned cut out of position and place the second cut before slot 34 so that hook arm 31 of the clamping structure fixed to its skin, may be dropped into the pulling means. The movable head mounting means 16 for the pairs of prongs 14 and 15 makes it possible for one operator to utilize the machine to the fullest possible extent.

A modified form of the above described machine is shown in Figure 4 and in this device a bifurcated hook 50 as shown in Figure 6, as provided, having diverging arms for engaging the bone of the meat cut and a clamp 51 is also provided for fixing to the skin. The jaws 52 and 53 of the clamp are urged together by manipulation of arms 54 and 55 which in turn are so connected that when a pulling action is exerted against the clamp, the jaws are driven together. The arms 54 and 55 are interconnected by a link 56 which at one end is pivotally connected to the arm 55 and at the other end is slidably connected to arm 54 in a suitable slot. The sliding end of link 56 is connected to the chain 57 and any pull exerted against the link 56 by chain 57 causes the lower end of link 56 to slide to the left, as in Figure 4, so that arm 55 is pulled downwardly to drive the jaw 53 against jaw 52.

The clamp is slidably mounted in a movable carriage 60 carried upon the top frame of the machine in suitable slide ways, the clamp being slidable in the carriage on a guide way 61. The carriage is adapted to be driven by a suitable power means such as air motor 70 and the driven piston of the air motor is connected to the carriage through the connecting rod 71, which is fixedly connected to carriage 60.

In the operation of the mechanism shown in Figures 4 and 5, the clamp 51 is attached to the skin tab 12 and then the power is supplied to the air motor so that the piston is driven to the left as shown in Figure 4. When the connecting rod 71 moves to the left, the carriage 60 is carried therewith. The clamp 51 remains stationary until the slack in chain 57 is taken up whereupon continued movement of the carriage causes the jaws 52 and 53 to be engaged tightly on the skin flap so that further movement of the carriage causes a drawing action to be applied against the skin so that it is forcibly stripped from the meat cut engaged upon the hook 50.

The motive power to the motor 70 is controlled by a suitable air valve 72 located adjacent the working station of the machine and by suitable manipulation of the valve the piston and the air motor can be driven to the left or right to effect first a pulling off of the skin and thereafter a return of the carriage to its initial starting position whereby the clamp can be engaged on a second cut to effect a removal of the skin.

As above stated, the skin of a shoulder or ham cut is prepared for removal by freeing a tab of skin adjacent the outside of the shoulder or hip joint. The surface on the inside of the animal's leg is cut skin deep along a line substantially parallel to the femur or humerus bone disposed in the cut. When the skin is prepared in this manner, the skin may be forcibly pulled off of the cut without damage to the skin or the meat cut.

As shown in Figure 1 the cut can be laid over on the table with the skin tab on top of the cut so that the clamp may be engaged on the tab and the skin pulled back upon itself as the clamp moves over the top of the cut. In some instances, the cut can be more easily placed on the hooks if the cut is handled as shown in Figure 4. In this instance, the cut is merely placed on the hook 50 in such a manner that the skin tab 12 is adjacent the clamp and when the clamp is fixed to the tab the cut is allowed to fall over onto the clamp so that the enlarged end of the bone is engaged in the hook as the cut falls onto the clamp. Thereafter, as the clamp is driven out from under the cut, the skin is forcibly drawn off of the meat. The pulling force exerted by the clamp on the tab will aid in turning down the cut onto the clamp. It is obvious that the rate at which the cut is turned will depend on how rigidly the cut is placed on the hook and on the amount of the force that is applied to it. In some instances, the cut may be turned more slowly and may not be completely turned down until the skin is partially or substantially wholly removed. The manner of engaging the meat cut on the hooks as shown in either Figures 1 or 4 may be used interchangeably with either form of the machine.

The above description of the machine shows its application to cuts of irregular shape. It is obvious that a flat cut could be fixedly engaged and its skin attached to one of the clamping means so that the skin could be drawn from the cut as described above. The machine is particularly adapted, however, to the removal of skin from irregular cuts such as shoulder and ham cuts where the meat may be separated from the skin by a mere pulling action.

In trimming certain cuts for the retail trade, it is the custom to leave a ring of skin around the hock or shank end of the cut. This may be accomplished in the present machine by cutting through the skin at the hock end before pulling the skin from the meat cut. It is likewise apparent that the skin may be stripped from the cut by pulling it from the hock end toward the butt end. The preferred stripping, however, is as above described.

Many modifications of the invention disclosed herein may occur to those skilled in the art. While the invention has been described and illustrated with means for holding the cut stationary while pulling the skin, it is readily apparent that the skin could be fixed and the cut moved. Figure 7 illustrates an embodiment of such machine. In this case the bracket which supports hook 50 is attached to chains 40 and 41 by means of cross bars 42 whereby the chains move the hook 50 across the top run to the right in Figure 7. Clamp 20 is held in a relatively fixed position, i. e., restrained against movement to the right in Figure 7 by reason of chain 28 being fixed to the frame of the machine as illustrated at 75.

The rotation of chains 40 and 41 may be any speed convenient to allowing the ham cut to be placed over hook 50 and the clamp 20 to be secured to tab 12 of the cut. As the hook 50 rises to the top run at the left end of Figure 7, the ham cut 10 may be slipped down over the hook as previously described in connection with Figure 4. The clamp 20 may be secured to tab 12 on the skin either before or after the cut is engaged upon the hook 50.

As chains 40 and 41 move hook 50 and cut 10 to the right in Figure 7, the slack in chain 28 will run out, and as the chain tightens, the pull on tab 12 will strip the skin from the cut with the cut being turned down into a horizontal position as the pull is applied. The position of the cut will be substantially that illustrated at the right end of Figure 7.

The length of the machine may be any distance which will satisfactorily permit the meat cuts to be mounted on the hooks, the skin to be pulled therefrom and the cuts to be subsequently removed from the hooks. The cuts may be removed after the skin has been stripped therefrom by lifting them up and by tipping them forwardly to disengage the bifurcated end of the hook 50 from the cut and bone thereof.

A single or plural grouping of pulling means may be associated with clamping means to hold the cuts, but as shown in the preferred form of the machine as shown in Figures 1 and 2, a single pulling means is adapted to cooperate with a plurality of holding means. All such modifications are considered to be within the scope of the following claims.

What is claimed is:

1. A machine for skinning meat comprising a frame structure, an endless conveyor mounted on the frame structure, means fixed on said conveyor for passing a meat piece therewith, and stationary clamping means mounted on said frame structure for holding an edge of skin on said meat piece against forward movement with said conveyor, said conveyor means permitting rotation of the meat piece about an axis below said edge of skin to turn the meat piece as the conveyor travels and thus remove the skin.

2. A machine for skinning a meat piece comprising a frame structure, an endless conveyor mounted on the frame structure, means fixed on said conveyor for passing a meat piece therewith, said means including a curved pointed hook adapted to engage the meat piece, and stationary clamping means mounted on said frame structure for holding an edge of skin on said meat piece against forward movement with said conveyor, said hook being pointed in the direction of movement thereof to permit turning of the meat piece as it is carried forwardly by said means to remove the skin therefrom.

3. A machine as set forth in claim 1 wherein said first means includes a pair of curved hooks pointed in the direction of movement thereof for engaging the meat piece on both sides of a bony section thereof.

4. A machine for removing the skin from meat pieces comprising a frame structure, a conveyor mounted on said frame, a table adjacent the receiving end of said conveyor on which a piece to be skinned may be placed, clamping means mounted on said frame structure adapted to be engaged about an edge portion of skin on a meat piece disposed on said table, means associated with said conveyor for engaging the piece of meat on said table and passing it forwardly with said conveyor while permitting rotation thereof about an axis perpendicular to the direction of motion and passing relatively close to the center of said meat, and means for holding said clamping means to remove the skin from the meat piece as the piece is passed forwardly on the conveyor by said engaging means.

5. A machine for pulling skin from a meat cut surrounding a bone having enlarged ends such as the humerus bone of a shoulder cut and the femur bone of a ham cut comprising means to engage the bone of said cut at one of the enlarged ends of the bone, a clamping means adapted to be fixedly secured to the skin, said clamping means being restrained against movement in a given direction, and power driven endless chain means adapted for connection with the engaging means to pull the engaging means away from said clamping means in said direction to pull the skin from the cut progressively from one end to the other.

6. A machine for pulling skin from a meat cut surrounding a bone such as the humerus bone of a shoulder cut and the femur bone of a ham cut; said machine comprising a frame; a power-driven conveyor mounted on said frame for movement in a given direction; a bifurcated holding means to relatively fixedly engage the bone of said cut, said means being mounted on said conveyor to move said cut in a given direction along a portion of the path of said conveyor; and a skin engaging means attached to said frame to restrain the movement of the skin engaging means in direction of the movement of said meat cut.

Mrs. FRERERIC J. COAD,
*Administratrix, same person as Gwendolyn Coad, of the estate of Frederic J. Coad, deceased.*

No references cited.